United States Patent [19]

Marguet et al.

[11] Patent Number: 5,537,815

[45] Date of Patent: Jul. 23, 1996

[54] POWER UNITS OF THE RAM-JET ENGINE TYPE

[75] Inventors: Roger Marguet, Issy les Moulineaux; Bernard Petit, Les Ulis Bures; Lionel Naduad, Massy; Pierre Borton, Boulogne Billancourt, all of France

[73] Assignee: Office National d'Etudes et de Recherches Aerospatiales, Bagneux, France

[21] Appl. No.: 840,952

[22] Filed: Feb. 27, 1986

[30] Foreign Application Priority Data

Jul. 12, 1985 [FR] France .................................. 85 10744

[51] Int. Cl.⁶ ....................................................... F02K 9/08
[52] U.S. Cl. ............................. 60/224; 60/248; 60/253
[58] Field of Search ............................... 60/224, 253, 248

[56] References Cited

U.S. PATENT DOCUMENTS

| | | | |
|---|---|---|---|
| 3,137,126 | 6/1964 | Madison | 60/253 X |
| 3,158,061 | 11/1964 | Lager | 60/253 X |
| 3,521,452 | 7/1970 | Longwell | 60/253 X |
| 3,848,408 | 11/1974 | Tompkins | 60/248 |
| 4,124,976 | 11/1978 | Holzman | 60/253 X |

FOREIGN PATENT DOCUMENTS

| | | | |
|---|---|---|---|
| 1153942 | 9/1963 | Germany | 60/253 |
| 3428469 | 2/1986 | Germany | 60/253 |
| 505747 | 5/1939 | United Kingdom | 60/253 |

*Primary Examiner*—Peter A. Nelson
*Attorney, Agent, or Firm*—Larson and Taylor

[57] ABSTRACT

The power unit of ram-jet type comprises an aerobic combustion chamber supplied by a fuel gas generator and by at least one air intake. The gas generator is essentially constituted by a solid propellant whose combustion generates a reducing gas and starting means are provided so that there occurs upstream or at the intake of the combustion chamber a primary combustion which raises the temperature of the air to a value such that stable combustion is produced between the oxidizing air and the reducing gases.
(FIG. 1a)

15 Claims, 3 Drawing Sheets

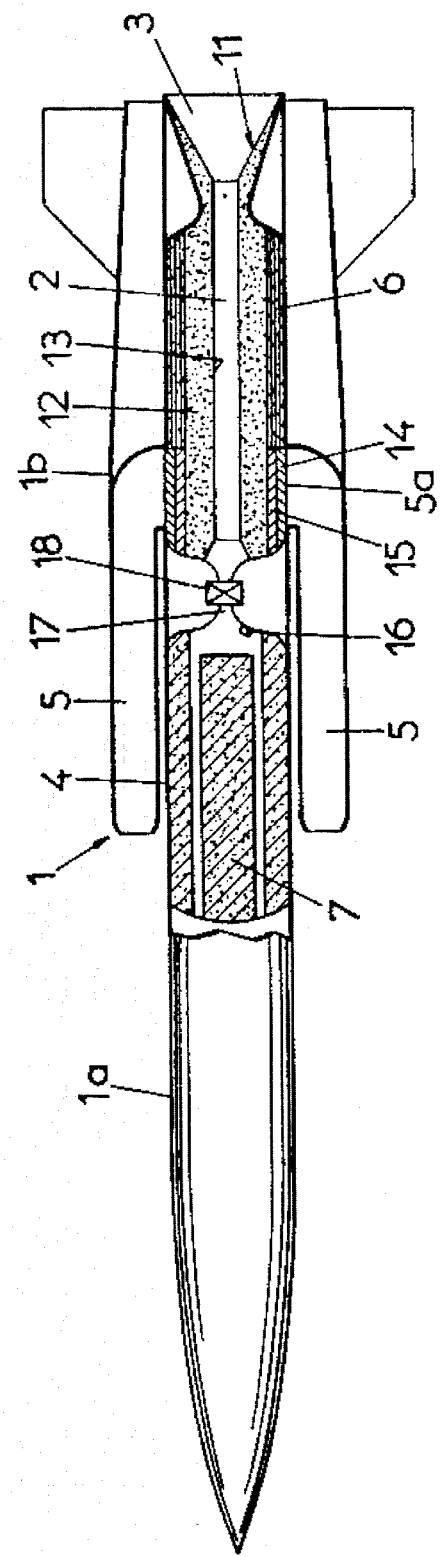
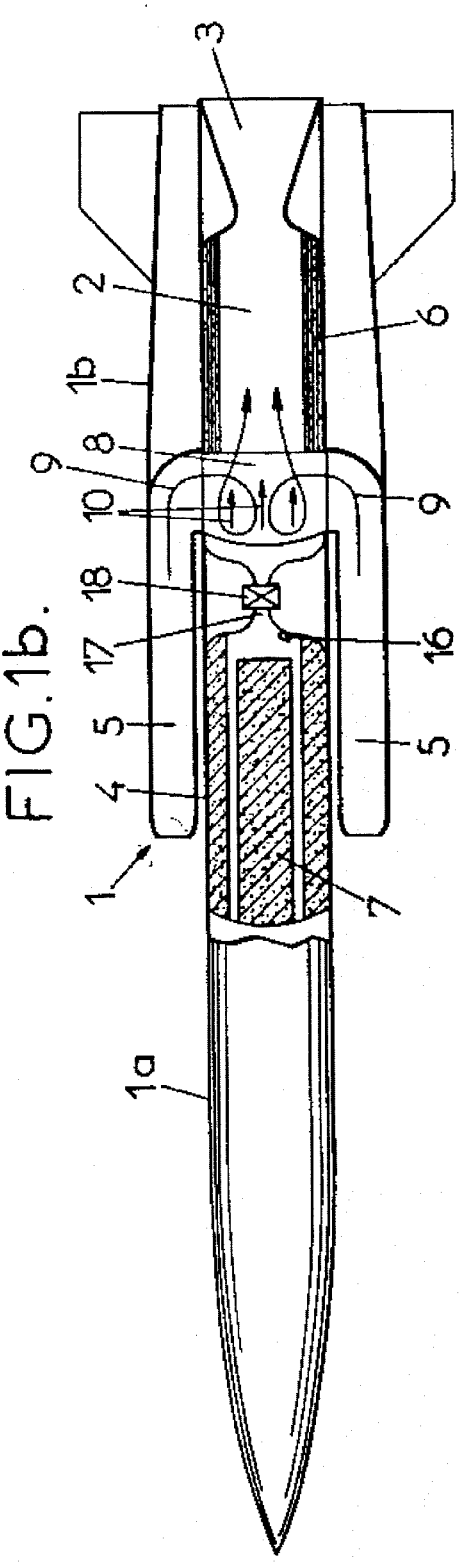

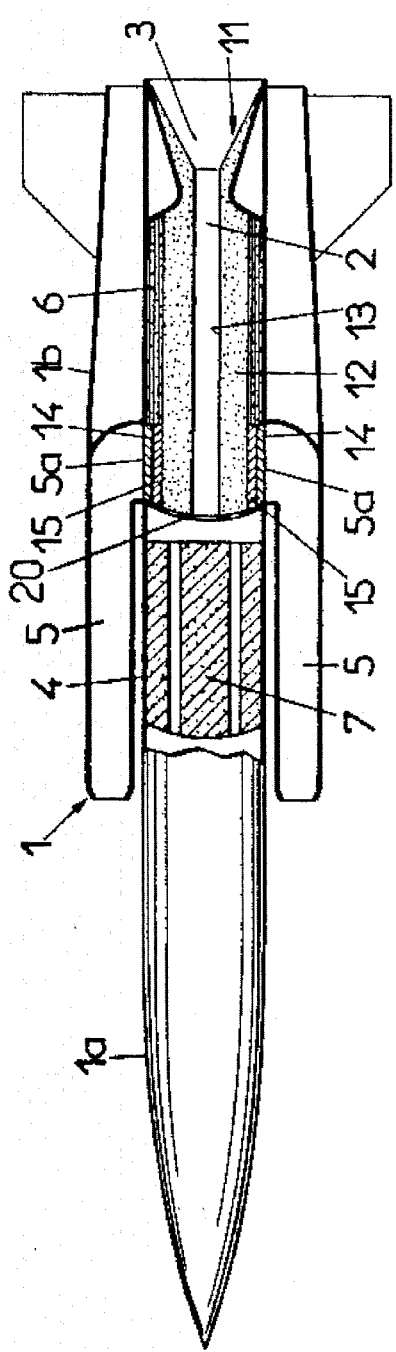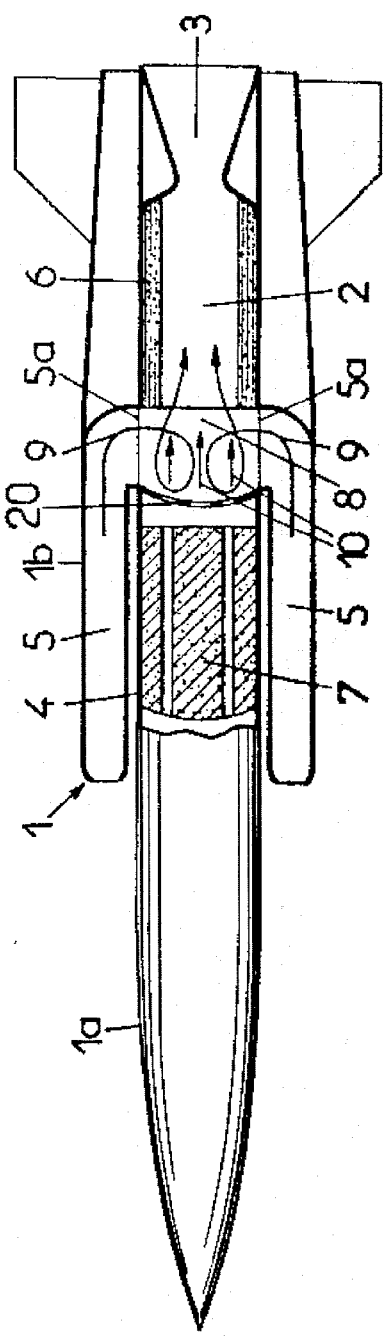

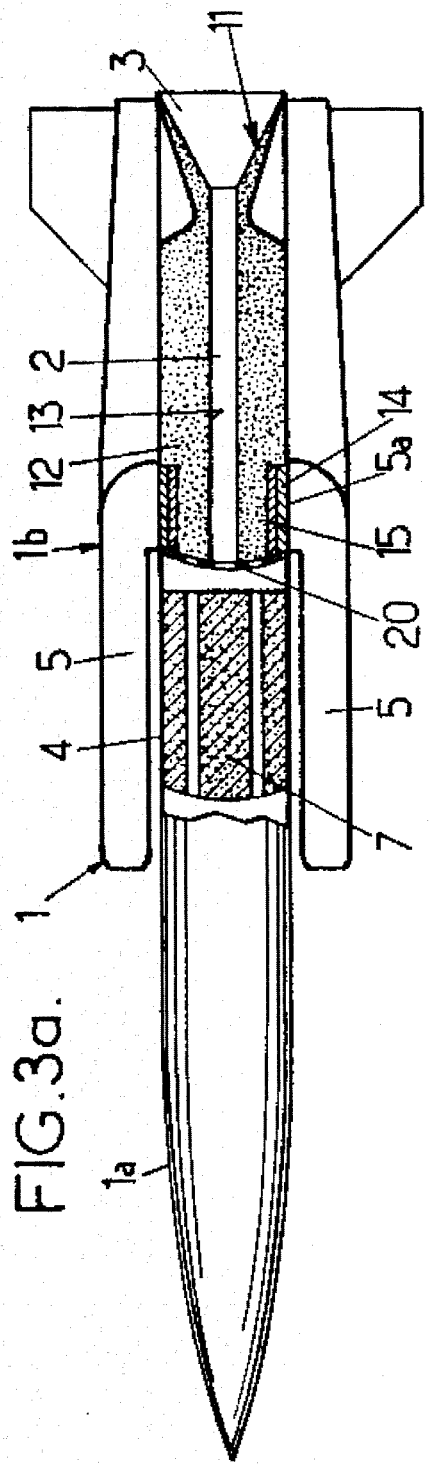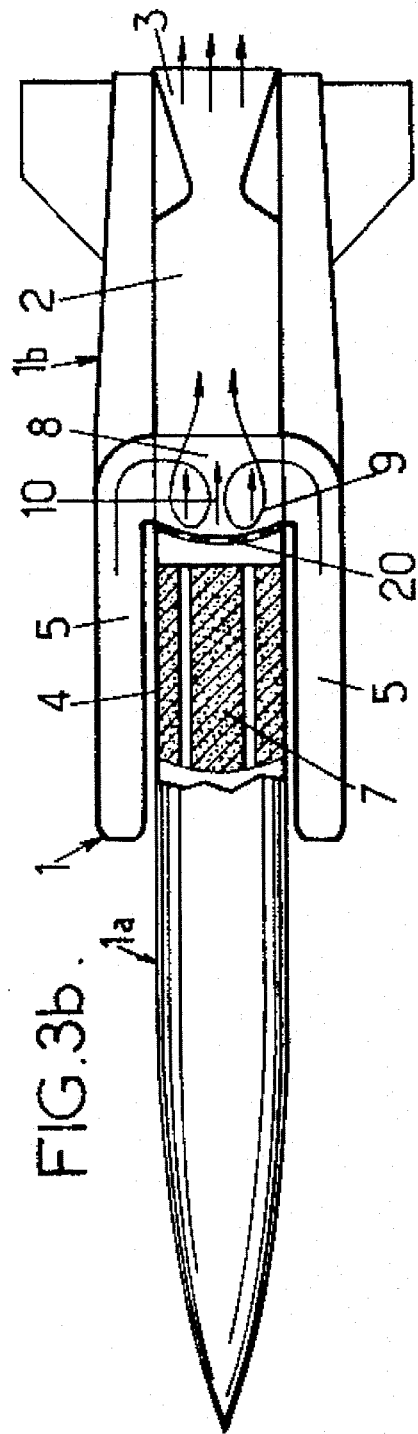

POWER UNITS OF THE RAM-JET ENGINE TYPE

The invention relates to power units of the ram-jet engine type comprising an aerobic combustion chamber, generally equipped with one nozzle, supplied by a fuel gas generator and by at least one air intake.

It is known to constitute the gas generator by a solid propellent commonly called a solid reactive mass, whose combustion generates a reducing gas, hence a fuel gas.

One can consider, at least to a first approximation, that the performance of such a power unit is all the greater as the propellent contains reducing elements; however, this propellent must also contain oxidizing elements in a proportion just sufficient to ensure the combustion, particularly the pyrolysis temperature, if it is desired to cause the combustion of the propellent by autopyrolysis.

Now, the fact that the propellent contains oxidizing elements reduces the performance of the propellent if one takes the point of view of combustion between the fuel gas delivered by the gas generator and the oxidizing air.

It is an object of the invention to provide a power unit which enables higher performance to be achieved than that of a power unit constructed as has just been mentioned.

It is also an object of the invention to provide a power unit of simple and more compact design, and, consequently, easier to construct and less expensive to manufacture.

The objects of the invention are achieved with a power unit of the ram-jet engine type comprising an aerobic combustion chamber supplied by a fuel gas generator and by at least one air intake, said power unit being characterized by the fact that, on the one hand, the gas generator is essentially constituted by a solid propellent whose combustion generates a reducing gas, and on the other hand, starting means are provided so that upstream or at the intake of the aerobic combustion chamber a primary combustion is produced which raises the temperature of the air to a value such that stable combustion occurs between the combustion-supporting air admitted through the air intake and the reducing gases generated by the combustion of the solid propellent.

In one embodiment of the invention, a part at least of the inner walls of the aerobic combustion chamber is covered by an ablatable solid fuel, the primary combustion upstream or at the intake of aerobic combustion chamber being then such that stable combustion occurs between the air admitted through the air intake and the abovesaid ablatable solid fuel.

According to a first feature of the invention, the starting means are constituted by a special igniter positioned upstream or at the intake of the aerobic combustion chamber.

According to another feature of the invention, triggering means are obtained by giving a solid propellent constituting the gas generator a composition such that the reducing gases are generated by its combustion have hypergolic properties with respect to the air.

Advantageously, the combustion of a solid propellent constituting the gas generator is effected by autopyrolysis.

From the constructional point of view, it is possible to resort to one or other of the following features:

either the fuel gas generator is separated from the aerobic combustion chamber by a sonic neck whose cross-section can be regulated by a control device, which permits the flow rate of the reducing gases to be varied and to be adapted to the flow rate of the air admitted (which is a function of the speed and the altitude of the missile on which the power unit is mounted), or the fuel gas generator is directly linked with the aerobic combustion chamber, which permits operation and low pressure of the gas generator, simplifies the design of the power unit, renders it more compact and less expensive, avoids the use of a special ignitor as starting means in the case where there is provided a solid propellent power unit integrated in the aerobic combustion chamber for the acceleration phase of the power unit.

The power unit may advantageously be arranged so that the primary combustion has a vortex motion. For this purpose, it is possible to provide an injection of reducing gas into the one or more air intakes and/or an injection of reducing gas into an upstream combustion chamber upstream, situated upstream of the aerobic combustion chamber.

In the case where the power unit comprises this upstream combustion chamber, it is advantageous to introduce therein combustion-supporting air and reducing gas with directions forming between them a sufficient angle to develop and maintain a vortex motion combustion.

In the case where an ablatable fuel is provided, the intitial flow rate of reducing gas is adjusted to the geometry of the ablatable solid fuel unit and the combustion pressure between the combustion-supporting air and this ablatable solid fuel.

The combustion in the aerobic chamber develops normally from the combustion core stabilized upstream. In this combustion core, there is observed, in fact, a constant average richness in the vicinity of stoechiometric proportions the air not-utilized in this combustion (which may be qualified as "pilot combustion") being reheated to participate in the combustion with the ablatable solid fuel.

The invention will be applied advantageously in the form of one of the three following modifications:

the first modification according to which the fuel gas generator is separated from the aerobic combustion chamber, said aerobic combustion chamber including on one part at least of its inner walls, an ablatable solid fuel; this modification combines the advantages of the increase in energy performance with that of the increase in the precision and the extent of the modulation range of the reducing gas flow rate, and consequently of the possibilities of adaptation to altitude and speed of the missile on which the power unit is mounted;

a second modification according to which the fuel gas generator is in direct connection with the aerobic combustionchamber, said aerobic combustion chamber comprising, on a part at least of its inner walls, an ablatable solid fuel; this modification enables the energy performance of the power unit to be increased and considerable possibilities of self-adaptation of the reducing gas flow rate to the air flow rate, to be preserved, thus simplifying particularly the system by suppression of the control device and of the special igniter as starting means;

a third modification according to which the fuel gas generator is in direct connection with the aerobic combustion chamber, said aerobic combustion chamber not including ablatable solid fuel; this modification, although less effective than the two preceding ones on the score of energy, offers the advantage of the being simple and inexpensive.

The invention will, in any case, be well understood by means of the additional description which follows as well as of the accompanying drawings, which description and drawings relate to different preferred modifications of the invention and do not, of course, imply any limiting character.

BRIEF DESCRIPTION OF THE DRAWINGS

FIGS. 1a and 1b relate to the first modification of the invention and show respectively a sectional view of a missile equipped with a power unit of the ram-jet type, the power unit being shown in its "acceleration" phase (FIG. 1a) and in its "cruising" phase (FIG. 1b).

FIGS. 2a and 2b relate to the second modification of the invention and show respectively a sectional view of a missile equipped with a power unit of the ram-jet type, the power unit being shown in its "acceleration" phase (FIG. 2a) and in its "cruising" phase (FIG. 2b).

FIGS. 3a and 3b relate to the third modification of the invention and show respectively a sectional view of a missile equipped with a power unit of the ram-jet type, the power unit being shown in its "acceleration" phase (FIG. 3a) and in its "cruising" phase (FIG. 3b).

DESCRIPTION OF THE INVENTION

In these figures, is shown a missile 1 of which the forward portion $1_a$ shields a useful charge and whose rear portion $1_b$ shields the power unit constructed according to an advantageous embodiment of the invention.

This power unit comprises an aerobic combustion chamber 2 equipped with a nozzle 3 and supplied, on the one hand, by a fuel gas generator 4, and, on the other hand, by several air intakes 5 of which only two are seen on the figures.

The fuel gas generator 4 is constituted by a solid propellent 7 of which the combustion generates a reducing gas; this combustion occurs preferably by autopyrolysis.

Means are then provided so that there occurs, upstream or at the intake of the aerobic combustion chamber 2, a primary combustion which raises the temperature to a value such that there is produced a stable combustion between the combustion-supporting air admitted through the air intake 5 and the reducing gases generated by the combustion of the solid propellant 7.

These means may be constituted by a special igniter placed upstream or at the intake of the aerobic combustion chamber 2; this igniter is well-known to the technician skilled in the art and has therefore not been illustrated.

These means may also be obtained by giving the solid propellant 7 of the fuel gas generator 4 a composition such that the reducing gas that generates has hypergolic properties with respect to air.

The power unit is advantageously arranged so that the primary combustion is of vortex form.

For this purpose, there may be provided an injection of the reducing gas into the air intakes 5 (solution not-shown) or an injection of the reducing gas into an upstream combustion chamber 8 situated upstream of the aerobic combustion chamber (FIG. $1_b$, $2_b$, $3_b$).

In this case, it is advantageous to introduce, into the upstream combustion chamber 8, the reducing gas 10 into the recirculating core formed by the air inject and shown at 9 (FIGS. $1_b$, $2_b$, $3_b$) for the purpose of developing and maintaining a vortex-form combustion.

To bring the power unit to the minmum speed from which the aerobic combustion chamber 2 can enter into operation, there may be arranged, in this aerobic combustion chamber 2, an ejectable aerobic engine 11 (FIGS. $1_a$, $2_a$, $3_a$).

This rocket-engine 11 may be simply constituted by a propellent unit 12 comprising a central channel 13 leading directly into the nozzle 3 of the aerobic chamber 2, this rocket engine 11 hence not including a nozzle.

To form a divergent element, the central channel 13 can open out into the divergent portion of the nozzle 3 of the aerobic combustion chamber 2, a layer of the propellent 12 then lining this divergent portion.

The discharging element 5a of the air intakes 5 is closed by ejectable doors 14, if necessary protected by a layer of an inhibiting material 15. These ejectable doors 14 are ejected (by means well-known to the man skilled in the art) before the entry into operation of aerobic chamber 2.

FIGS. $1_a$, $2_a$, $3_a$ show the configuration of the missile 1 with the rocket engine 11 inside the aerobic combustion chamber 2; this configuration lasts during the whole "acceleration phase".

FIGS. $1_b$, $2_b$, $3_b$ show the configuration of the missile 1, once the "acceleration phase" is terminated and the "cruising phase" reached from which the aerobic combustion chamber 2 can be placed in operation.

If reference is made to the modification of the invention illustrated in FIGS. $1_a$ and $1_b$, the fuel gas generator 4 is separated from the aerobic combustion chamber 2; this comprises, on a portion at least of its inner walls, an ablatable solid fuel 6.

A sonic throat 17 is provided between the fuel gas generator 4 and the aerobic combustion chamber 2, this sonic throat 17 being equipped with a control device 18 enabling its cross-section to be regulated so that the flow rate of reducing gas 10 can be varied and adapted to the flow rate of the air admitted.

The ignition of the solid propellent 7 of the gas generator 4 is initiated by the firing of an igniter 16; the reducing gases 10, after having traversed the sonic throat 17 and its control device 18, form, a flame with the air admitted though the intakes 5 under the effect of the starting means (hypergolicity reaction between the reducing gases and the air, or presence of a special igniter). This combustion which raises the temperature in the aerobic combustion chamber 2 results in the ablation of the ablatable solid fuel 6 and the combustion of the additional reducing gases thus produced with the air.

When the gas generator 4 is joined directly with the aerobic combustion chamber 2 (FIGS. $2_a$, $2_b$ and FIGS. $3_a$, $3_b$), the solid propellent 7 is shielded, either in a chamber separated from the aerobic chamber by a wall comprising a plurality of orifices, or in the aerobic combustion chamber itself, without a separating wall. The gas generator then operates at a pressure which exists in the aerobic combustion chamber 2, this pressure being itself a function of the flight conditions.

If reference is made to the modification of the invention illustrated in FIGS. $2_a$ and $2_b$, the fuel gas generator 4 is directly joined with the aerobic combustion chamber 2: the latter comprises, over a portion at least of its inner walls an ablatable solid fuel 6. A wall 20 including a plurality of orifices places the chamber of the gas generator 4 in communication with the aerobic combustion chamber 2.

The ignition of the propellent 12 of the rocket-motor 11 (ignition started by a conventional igniter (not shown) causes the start of the autopyrosis reaction in the solid propellent 7 of the fuel gas generator 4. There is then obtained, through reduced consumption of this solid propellent 7, an automatic operation of the power unit initiated by the ignition alone of the propellent 12 of the rocket motor 11.

By the expression "ablatable solid fuel" is meant the solid fuel which, under given conditions of temperature and of pressure, passes from the solid state to the gaseous state, the combustion then taking place in a gaseous medium between this fuel in the gaseous state, and an oxidation-supporting gas, for example air.

By way of example, there is indicated below the progress of the operation of the power unit constructed according to one or other of the two modifications which have just been described.

Time 0: Signal for ignition of the propellent 12 of the rocket-motor 11.

Time+0.1 s: Rise in pressure to 70 bars in the combustion chamber (pressure measured at the forward end of the central channel 13) of the rocket-motor, and starting of the autopyrolysis in the solid propellent 7 of the fuel gas generator 4.

Time+4 s: End of the combustion of the propellent 12 of the rocket-motor 11, and end of the "acceleration phase". The missile then reaches a speed of about Mach 2; the autopyrolysis reaction in the solid propellent 7 of the gas generator 4 continues.

Time+4.1 s: End of the remaining thrust of the propellent of rocket-motor 11, ejection of the ejectable doors 14 (ejection caused by a pressure difference of the order of 0.2 bar) and ejection of the charge residues of the rocket-motor 11.

Time+4.2 s: Beginning of the operation of the aerobic combustion chamber 2 caused by the hypergolicity reaction betwee the fuel gas of the gas generator 4 and the air delivered by the air intakes 5; the conditions for this hypergolicity reaction are combined at the end of the combustion of the propellent 12 of the rocket-motor 11. The primary combustion therefore takes place with the fuel gas emerging from the gas generator 4 and continues with the gas resulting from the ablation of the ablatable solid fuel 6. The total duration of combustion is about 20 s.

Time+20 s: End of this combustion.

As regards the solid propellent of the fuel gas generator, it may advantageously have a composition such that its ratio K (ratio of the oxidizing mass to the fuel mass) is less than 2, and preferably than 1.

This autopyrolysable propellent may also have the following characteristics:
pressure exponent n of the relationship $V_b = a \cdot p^n$ in which $V_b$ is the combustion speed and a is a constant: $0.20 \leq n \leq 0.60$, in the range from 0.5 to 10 bars.
density: 1.31 g/cm³.
annular or star-shaped charge
combustion speed: 1.2 mm/s
combustion pressure between the gas resulting from the autopyrolysis and the air: 3.2 bars. This pressure depends on the speed and the altitude of the missile.

More generally, for the first modification, the exponent n indicated above may be comprised between 0.3 and 0.8 ($0.3 \leq n \leq 0.8$) for a pressure range going from some bars to more than one hundred bars. For relatively low pressures (second modification), less than or equal to 20 bars, this exponant n could then be comprised between 0.3 and 1.7 ($0.3 \leq n \leq 1.7$).

Such an autopyrolysable propellent may be constituted by a mixture of 39.03% of polybutadine, 40.06% of ammonium perchlorate, 9.29% of magnesium 4.65% of Porofor AZB, 4.65% of Nitroguanidine and 2.32% of iron carbonyl.

This propellent has a ratio K=0.72.

As regards the ablatable solid fuel, recourse may be had to those having the compositions indicated below:
60% of Afcolene and 40% of polybutadiene,
40% of polyethylene and 60% of polybutadiene,
80% of anthracene and 20% of polybutadiene.

If reference is made to the modification of the invention illustrated in FIGS. $3_a$ and $3_b$, the fuel gas generator 4 is joined directly to the aerobic combustion chamber 2: the latter does not include an ablatable solid fuel.

The ignition and the progress of the operation of such a power unit are the same as those previously envisaged, with the exception of the phase corresponding to the ablation of the ablatable solid fuel.

Finally, and whatever the embodiment adopted, a power unit of the ram-jet type is provided which exhibits all or part of the following principal advantages:
the power unit enables performances to be achieved such that they are comparable to those of a liquid fuel and oxidizer power unit, and this whilst preserving integrally the advantages of a powder power unit,
the power unit is regulated by reason of the modulation of the fuel gas generated by the gas generator which may be adapted optimally to the air flow rate, due to the use of a control device operating automatically (first modification of the invention),
the power unit has the ability to adapt itself automatically to the speed and the altitude of the missile,
the power unit exhibits a stable combustion,
the inner walls of the aerobic combustion chamber are thermally self-protected by the ablatable solid fuel,
the aerobic combustion chamber can shield, for the acceleration, an ejectable rocket-motor, and this without any risk for the aerobic combustion chamber,
the power unit is self-regulated as a result of operation of the fuel gas generator at a pressure in the vicinity of that of the aerobic combustion chamber (second and third modifications of the invention),
the power unit has reliability qualities as regards the ignition of the autopyrolysable propellent of the gas generator and of the ablatable solid fuel, this ignition being caused by the ignition alone of the ejectable rocket-motor, that is to say by the firing of the missile (second and third modifications),
the power unit is easy to construct, low in cost, whilst having a great reliability.

We claim:

1. A power unit of the ram-jet engine type comprising an aerobic combustion chamber having inner walls, said aerobic combustion chamber being supplied by a reducing gas generator and by at least one air intake, said reducing gas generator being essentially constituted by a solid propellent whose combustion generates a reducing gas, starting means being provided so that there is produced at the intake of the combustion chamber or upstream thereof a primary combustion which raises the temperature of the air to a value such that stable combustion between the oxidizing air and the reducing gases is produced.

2. A power unit according to claim 1, wherein a portion at least of the inner walls of said aerobic combustion chamber is covered by an ablatable solid fuel.

3. A power unit according to claim 1, wherein said reducing gas generator is separated from said aerobic combustion chamber by a sonic throat, said unit further comprising control means for adjusting the cross section of said sonic throat so as to adapt the fuel flow rate to the air flow rate.

4. A power unit according to claim 1, wherein said reducing gas generator is directly connected with the aerobic combution chamber.

5. A power unit according to claim 1, wherein the combustion of said solid propellent is effected by autopyrolysis.

6. A power unit according to claim 1, wherein said starting means are constituted by an igniter.

7. A power unit according to claim 1, wherein said starting means are obtained by giving to said solid propellant a compositon such that the reducing gases that it generates have hypergolicity properties with respect to the air.

8. A power unit according to claim 1, arranged so that said primary combustion is a vortex-form combustion.

9. A power unit according to claim 1, wherein said reducing gas is injected in at least one air intake.

10. A power unit according to claim 1, wherein said reducing gas is injected in an upstream combustion chamber situated upstream of said aerobic combustion chamber.

11. A power unit according to claim 10, wherein said reducing gas is introduced into a recirculating core, formed by the injected air, to develop and maintain a vortex-form combustion in said upstream combustion chamber.

12. A power unit according to claim 1, wherein said solid propellent has a composition such that its ratio K is less than 2, wherein K is the ratio of the oxidizing mass of the composition to the fuel mass thereof.

13. A power unit according to claim 1, wherein said solid propellant has a wide range of pressure exponent n ($0.3 \leq n \leq 0.8$) in an extended pressure field (from some bars to more than one hundred bars).

14. A power unit according to claim 1, wherein said solid propellant has a wide range of pressure exponent n, where ($0.3 \leq n \leq 1.7$,) at a low pressure p wherein $p \leq 20$ bars.

15. A power unit according to claim 1, comprising for the acceleration, a rocket-motor, integrated into said aerobic chamber.

* * * * *